(12) United States Patent
Damnjanovic et al.

(10) Patent No.: US 10,904,801 B2
(45) Date of Patent: Jan. 26, 2021

(54) MULTICARRIER ACCESS FOR SPECTRUM POOLING

(71) Applicant: QUALCOMM Incorporated, San Diego, CA (US)

(72) Inventors: Aleksandar Damnjanovic, Del Mar, CA (US); Juan Montojo, San Diego, CA (US); Junyi Li, Chester, NJ (US); Xiaoxia Zhang, San Diego, CA (US); Taesang Yoo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 101 days.

(21) Appl. No.: 15/886,660

(22) Filed: Feb. 1, 2018

(65) Prior Publication Data
US 2018/0227804 A1    Aug. 9, 2018

Related U.S. Application Data

(60) Provisional application No. 62/455,790, filed on Feb. 7, 2017.

(51) Int. Cl.
*H04W 28/26* (2009.01)
*H04W 72/04* (2009.01)
(Continued)

(52) U.S. Cl.
CPC ....... *H04W 28/26* (2013.01); *H04W 72/0453* (2013.01); *H04W 72/1215* (2013.01);
(Continued)

(58) Field of Classification Search
CPC ............. H04W 28/26; H04W 72/1278; H04W 74/002; H04W 16/14; H04W 72/1215;
(Continued)

(56) References Cited

U.S. PATENT DOCUMENTS

| | | | | |
|---|---|---|---|---|
| 2015/0281974 A1* | 10/2015 | Ghasemzadeh | ....... | H04W 16/14 455/454 |
| 2016/0105897 A1* | 4/2016 | Liu | .................... | H04W 72/1226 370/235 |
| 2016/0157103 A1* | 6/2016 | Teng | ..................... | H04W 16/14 370/329 |

FOREIGN PATENT DOCUMENTS

| WO | WO-2014070065 A1 | 5/2014 |
|---|---|---|
| WO | WO-2015003749 A1 | 1/2015 |
| WO | WO-2016048475 A1 | 3/2016 |

OTHER PUBLICATIONS

International Search Report and Written Opinion—PCT/US2018/016654—ISA/EPO—dated Apr. 12, 2018.

* cited by examiner

*Primary Examiner* — Jackie Zuniga Abad
(74) *Attorney, Agent, or Firm* — Haynes and Boone, LLP

(57) ABSTRACT

Wireless communications systems and methods related to spectrum pooling among multiple carriers or operators for peak rate performance improvement are provided. A first wireless communication device communicates, with a second wireless communication device, a first reservation request signal to reserve a transmission period in a frequency spectrum shared by a first operator and a second operator. The first wireless communication device and the second wireless communication device are associated with the first operator and a first cell. The first reservation request signal carries a request signature sequence associated with the first cell. The first wireless communication device communicates, with the second wireless communication device, data during the transmission period in the frequency spectrum shared by the first and second operators.

29 Claims, 10 Drawing Sheets

(51) Int. Cl.
  *H04W 72/12* (2009.01)
  *H04W 74/00* (2009.01)
  H04W 88/06 (2009.01)
  H04W 88/10 (2009.01)
  H04W 16/14 (2009.01)
  H04W 48/16 (2009.01)

(52) U.S. Cl.
  CPC ..... *H04W 72/1278* (2013.01); *H04W 74/002* (2013.01); *H04W 16/14* (2013.01); *H04W 48/16* (2013.01); *H04W 88/06* (2013.01); *H04W 88/10* (2013.01)

(58) Field of Classification Search
  CPC . H04W 72/0453; H04W 48/16; H04W 88/06; H04W 88/10
  See application file for complete search history.

MULTICARRIER ACCESS FOR SPECTRUM POOLING

CROSS REFERENCE TO RELATED APPLICATIONS

The present application claims priority to and the benefit of the U.S. Provisional Patent Application No. 62/455,790, filed Feb. 7, 2017, which is hereby incorporated by reference in its entirety as if fully set forth below and for all applicable purposes.

TECHNICAL FIELD

This application relates to wireless communication systems, and more particularly to spectrum pooling among multiple carriers or operators to increase peak rate performance.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless network may be operated by one or more operators or carriers. Each operator may operate over one or more licensed bands. One approach to increasing peak rate performance is to expand the use of spectrum beyond licensed bands. For example, license assisted access (LAA) uses carrier aggregation to combine a licensed band and an unlicensed band, allowing BSs to communicate with UEs over both the licensed band and the unlicensed band. The use of unlicensed bands may be complex, requiring coordination across different wireless technologies and changes to UEs' implementations. Accordingly, procedures for increasing peak rate performance within licensed bands may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicate, by a first wireless communication device with a second wireless communication device, a first reservation request signal to reserve a transmission period in a frequency spectrum shared by a first operator and a second operator, wherein the first wireless communication device and the second wireless communication device are associated with the first operator and a first cell, and wherein the first reservation request signal carries a request signature sequence associated with the first cell; and communicating, by the first wireless communication device with the second wireless communication device, data during the transmission period in the frequency spectrum shared by the first and second operators.

In an additional aspect of the disclosure, an apparatus includes a transceiver configured to communicate, with a second wireless communication device, a first reservation request signal to reserve a transmission period in a frequency spectrum shared by a first operator and a second operator, wherein the apparatus and the second wireless communication device are associated with the first operator and a first cell, and wherein the first reservation request signal carries a request signature sequence associated with the first cell; and communicate, with the second wireless communication device, data during the transmission period in the frequency spectrum shared by the first and second operators.

In an additional aspect of the disclosure, a computer-readable medium having program code recorded thereon, the program code includes code for causing a first wireless communication device to communicate, with a second wireless communication device, a first reservation request signal to reserve a transmission period in a frequency spectrum shared by a first operator and a second operator, wherein the first wireless communication device and the second wireless communication device are associated with the first operator and a first cell, and wherein the first reservation request signal carries a request signature sequence associated with the first cell; and code for causing the first wireless communication device to communicate, with the second wireless communication device, data during the transmission period in the frequency spectrum shared by the first and second operators.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
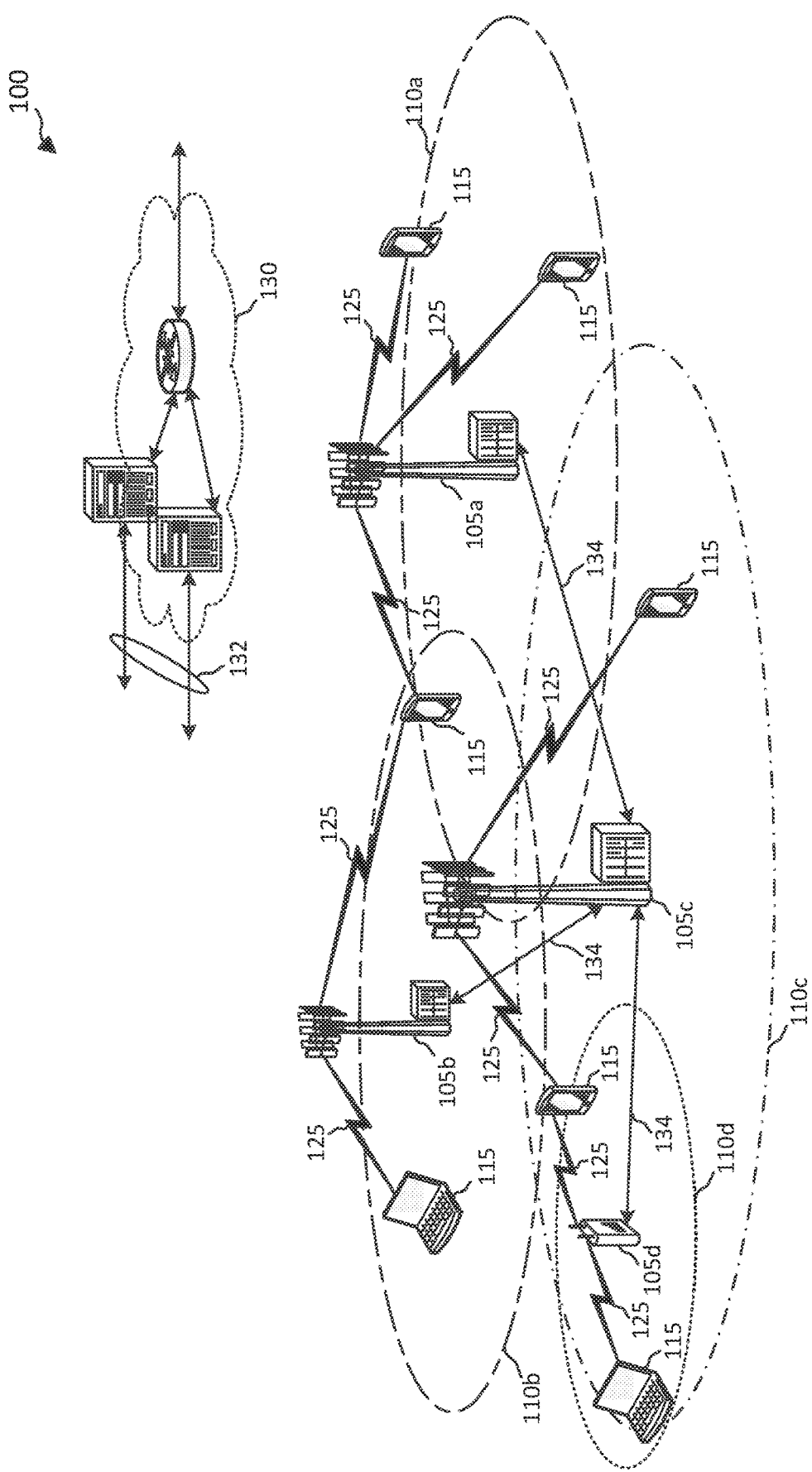
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes spectrum pooling mechanisms among multiple carriers or operators to allow a secondary utilization of a licensed spectrum. The sharing or pooling of a licensed spectrum can be based on an agreement. A spectrum owner may utilize the shared spectrum on a priority basis. When the spectrum is not occupied by the spectrum owner, another operator under the agreement may utilize the spectrum. The spectrum owner may be referred to as a primary user. The other operator may be referred to as a secondary user. The shared spectrum may be time-partitioned into a plurality of sharing frame periods. A sharing frame period may include a reservation period and a data transmission period. A base station (BS) of the primary user may send a reservation request signal in the reservation period to reserve the shared spectrum for a following data transmission period. A user equipment (UE) of the primary user may respond with a reservation response signal. The secondary user may monitor the channel (e.g., the spectrum) for a reservation request signal and/or a reservation response signal from the primary user. The secondary user may yield access to the channel based on a detection of the reservation request signal and/or the reservation response signal.

In an embodiment, to facilitate the detection, the reservation request signal and the reservation response signal may each include a cell-specific signature sequence, which may be a particular physical waveform. For example, the reservation request signal can include a cell-specific reference signal (CRS), and the reservation response signal can include a cell-specific sounding reference signal (SRS), which may be a common SRS for all primary UEs or within a subset of SRSs specific to the primary user's cell. To increase the detectability of the reservation response signal, the primary UE can perform UL power control based on a path loss (PL) towards the secondary user's cell (e.g., a neighboring cell) for the reservation response signal transmission. The primary user can utilize the shared spectrum for UL and/or DL communications. In one embodiment, the secondary user can utilize the shared spectrum for DL communications. In another embodiment, the secondary user can utilize the shared spectrum for UL and/or DL communications. The sharing mechanisms are described in greater detail herein.

Aspects of the present disclosure can provide several benefits. For example, the sharing of licensed frequency bands can increase operators' peak rate performances. Operators' traffic loads may vary from time to time. During a certain time period, a first operator may have a light traffic load, while a second operator may have a high traffic demand. The sharing allows the second operator to utilize a first operator's licensed frequency band that may otherwise be unused or underutilized. In addition, the disclosed embodiments enable operators with less spectrum holdings to satisfy demands of high-end category (e.g., high data rates) UEs. Thus, demands of high-end category UEs are not limited by operators' spectrum allocations. While the disclosed embodiments are described in the context of sharing between secondary cell (Scell) spectrums, the disclosed embodiments can be applied to sharing between primary cell (Pcell) spectrums and/or between a Pcell spectrum and a Scell spectrum. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes an UL subframe in an UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit CRSs and/or channel state information—reference signals (CSI-RSs) to enable a UE 115 to estimate a DL channel. Similarly, a UE 115 may transmit SRSs to enable a BS 105 to estimate an UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. AN UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-automatic request Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

Figure 2:
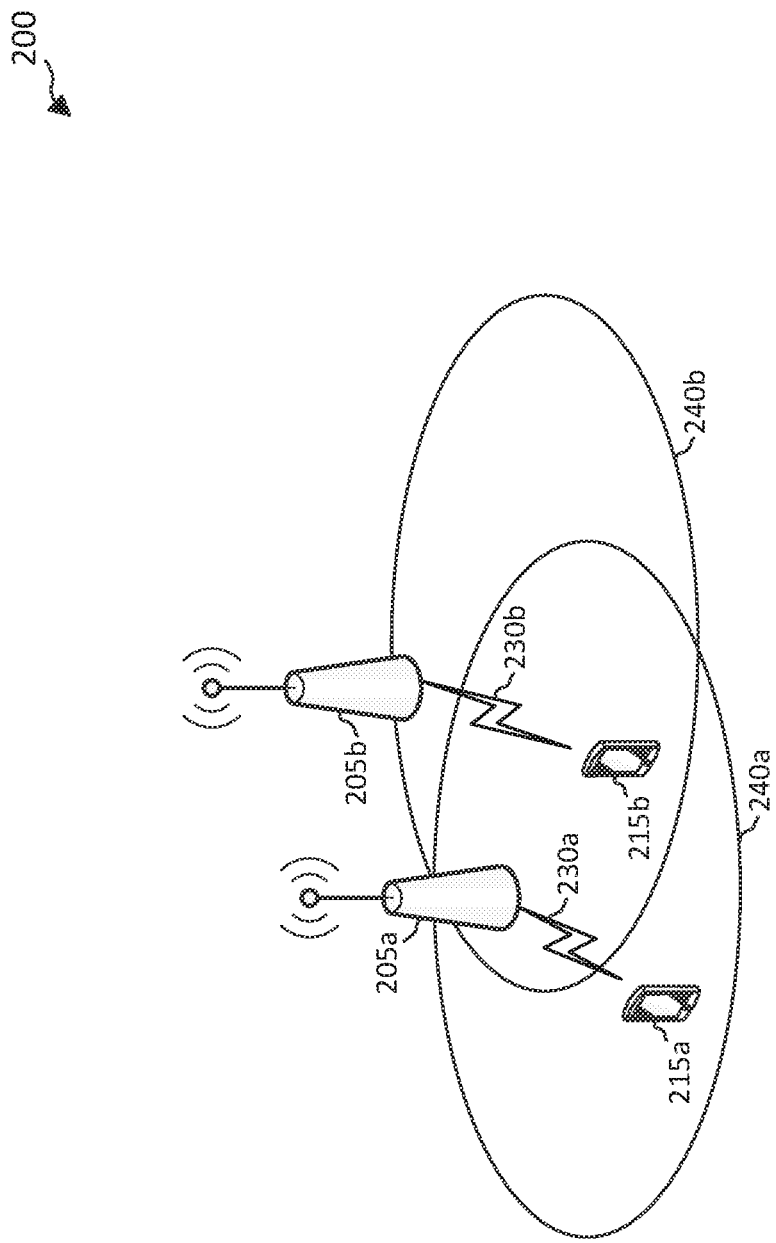
FIG. 2 illustrates an example of a wireless communications network operated by multiple operators according to embodiments of the present disclosure.

FIG. 2 illustrates an example of a wireless communications network 200 operated by multiple operators according to embodiments of the present disclosure. The network 200 may be similar to the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. For example, Operator A operates the BS 205a and the UE 215a in a cell 240a, while Operator B operates the BS 205b and the UE 215b in a cell 240b. Operator A may have one or more licensed frequency bands. The BS 205a and the UE 215a may communicate over a link 230a using Operator A's licensed frequency bands, for example, by applying carrier aggregation. Similarly, Operator B may have one or more licensed frequency bands different than Operator A's licensed frequency bands. The BS 205b and the UE 215b may communicate over a link 230b using Operator B's licensed frequency bands by applying carrier aggregation.

In an embodiment, Operator A and Operator B may agree to share at least some of the licensed frequency bands to better utilize some of the licensed bands during idle periods. For example, during certain time periods, Operator A may have a light traffic load (e.g., between the BS 205a and the UE 215a), while Operator B may have a high traffic demand (e.g., between the BS 205b and the UE 215b). As such, some of Operator A's licensed bands may be idle. Thus, by allowing sharing of licensed bands, Operator B may use the idled licensed bands of Operator A to meet the high traffic demand. The mechanisms for sharing licensed bands are described in greater detail herein.

Figure 3:
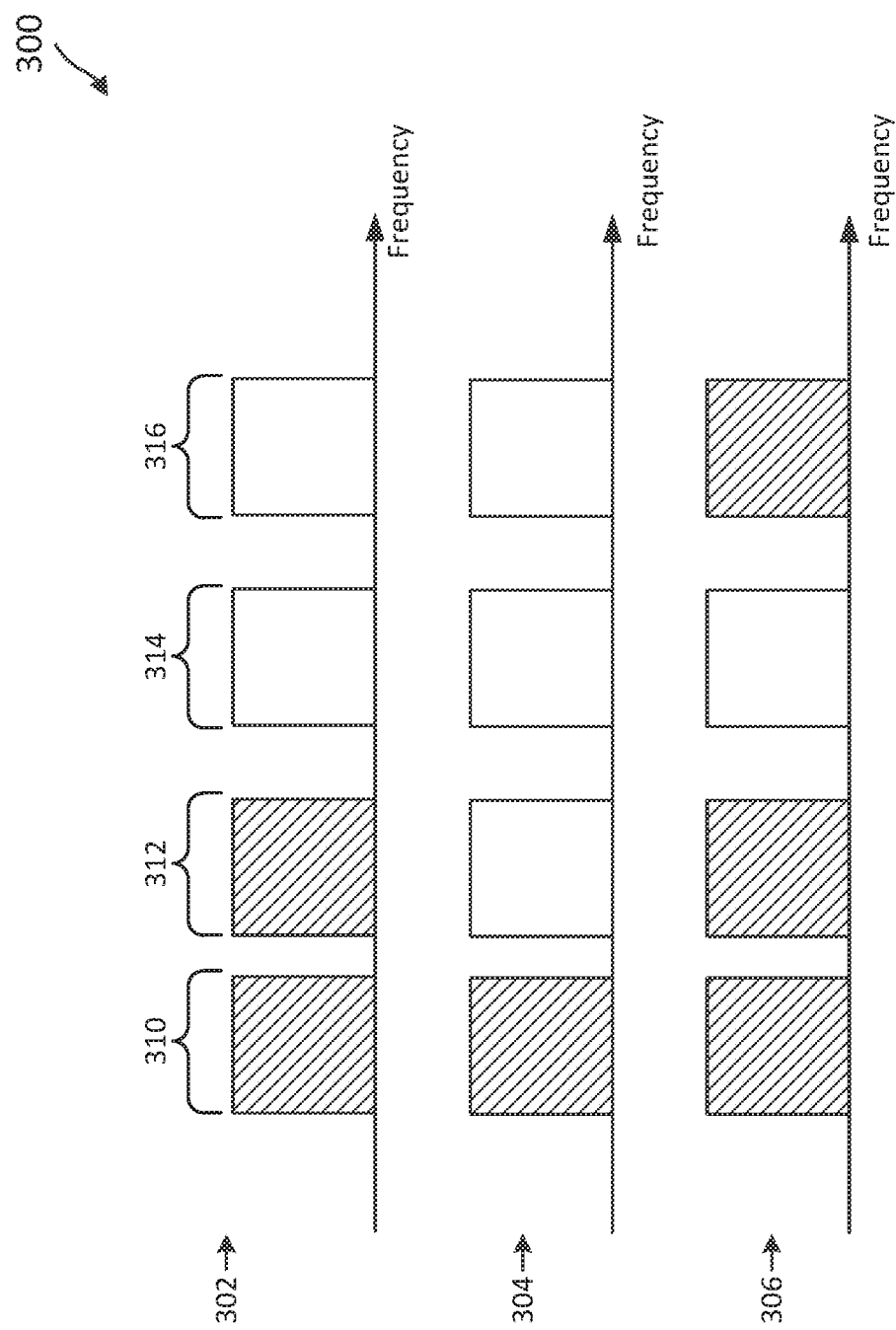
FIG. 3 illustrates an example of a licensed band sharing scheme according to embodiments of the present disclosure.

FIG. 3 illustrates an example of a licensed band sharing scheme 300 according to embodiments of the present disclosure. The scheme 300 can be employed by the BSs 105 and 205 and UEs 115 and 215. In FIG. 3, the x-axes represent frequency in some constant units. The scheme 300 includes four licensed frequency bands 310, 312, 314, and 316. As an example, Operator A may license the frequency bands 310 and 312, and Operator B may license the frequency bands 314 and 316. The patterned boxes represent frequency bands used by Operator A. The empty boxes represent frequency bands used by Operator B.

In a normal usage scenario 302, Operator A may utilize the frequency band 310 as a Pcell spectrum for connection related operations and normal operational communications (e.g., control and data) and utilize the frequency band 312 as a Scell spectrum to provide additional radio resources. For example, Operator A may apply carrier aggregation to combine the frequency bands 310 and 312 to provide a higher data rate performance. Similarly, Operator B may utilize the frequency band 314 as a Pcell spectrum for connection related operations and normal operational communications and utilize the frequency band 316 as a Scell to provide additional radio resources.

In an embodiment, Operator A and Operator B may have an agreement to share the Scell frequency bands 312 and 316. For example, in a scenario 304, when Operator A's frequency band 312 is not occupied by Operator A, Operator B utilizes Operator A's frequency band 312 to further provide additional radio resources. Alternatively, in a scenario 306, when Operator B's frequency band 316 is not occupied by Operator B, Operator A utilizes Operator B's frequency band 316 to further provide additional radio resources. Thus, the sharing of licensed frequency bands among operators can increase the operators' peak rate performance. The sharing of the frequency bands 312 and 316 between Operator A and Operator B may terminate when the agreement terminates. While the scheme 300 is illustrated with two operators sharing Scell frequency bands, the scheme 300 may be applied to any suitable number of operators and may include sharing of Pcell frequency bands and/or sharing of Pcell and Scell bands. When the sharing includes a Pcell frequency band, coordination may be required to accommodate paging.

Figure 4:
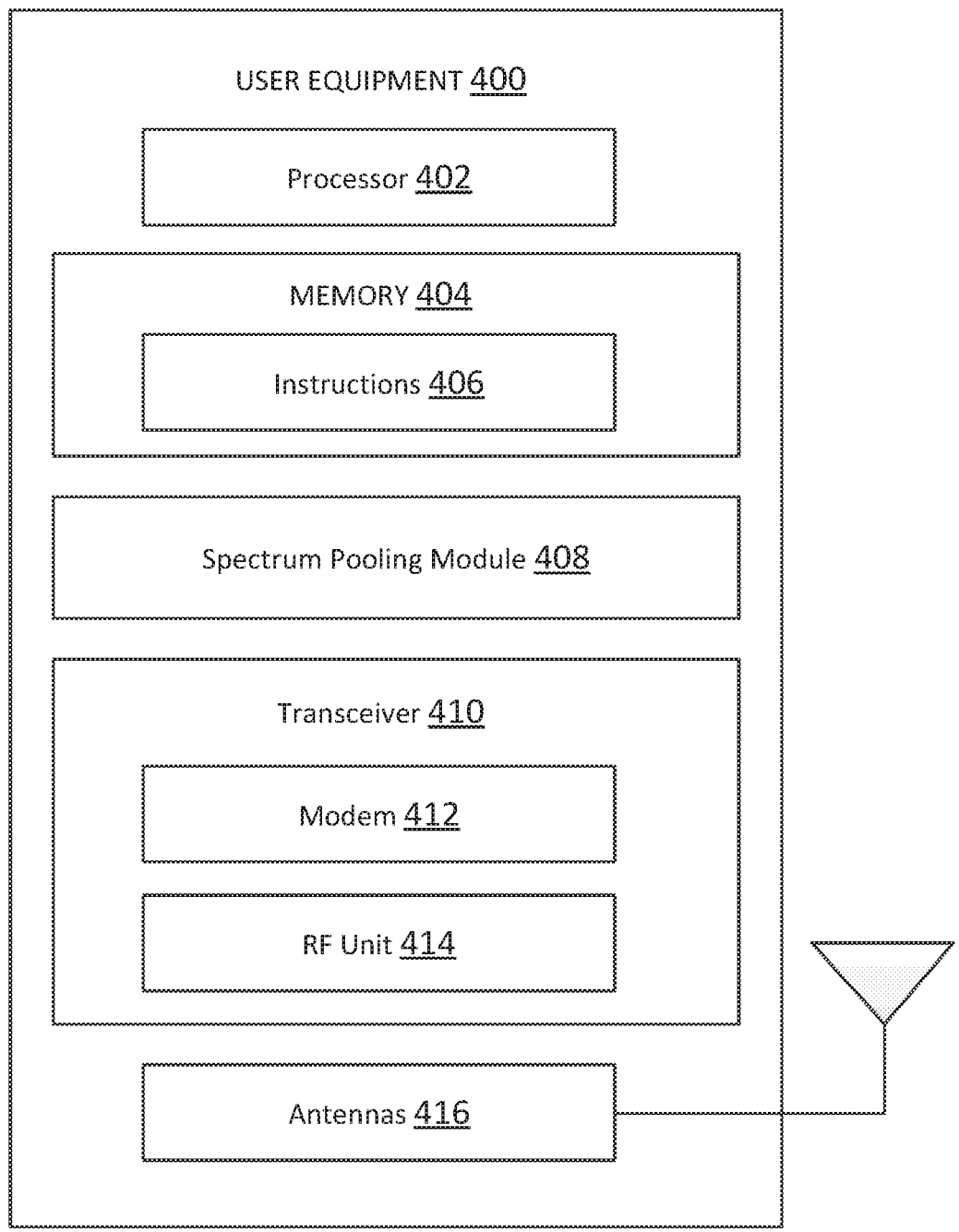
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 215 as discussed above. As shown, the UE 400 may include a processor 402, a memory 404, a spectrum pooling module 408, a transceiver 410 including a modem subsystem 412 and a radio frequency (RF) unit 414, and an antenna 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum pooling module 408 may be implemented via hardware, software, or combinations thereof. For example, the spectrum pooling module 408 may be implemented as a processor, circuit, and/or instructions 406 stored in the memory 404 and executed by the processor 402. The spectrum pooling module 408 may be used for various aspects of the present disclosure. For example, the spectrum pooling module 408 is configured to perform cell discovery, determine system timing and reservation signature sequences of neighboring cells operated by other operators, identify sharing frame structure, perform network listening, reserve time intervals in a shared spectrum, and/or perform power control on reservation signal transmissions, as described in greater detail herein.

As shown, the transceiver 410 may include the modem subsystem 412 and the RF unit 414. The transceiver 410 can be configured to communicate bi-directionally with other devices, such as the BSs 105 and 205. The modem subsystem 412 may be configured to modulate and/or encode the data from the memory 404 and/or the spectrum pooling module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215 or a BS 205. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of reservation response signals with cell-specific signature sequences according to embodiments of the present disclosure. The antenna 416 may further receive data messages transmitted from other devices. This may include, for example, reception of reservation request signals with cell-specific signature sequences and/or reservation response signals with cell-specific signature sequences according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416.

Figure 5:
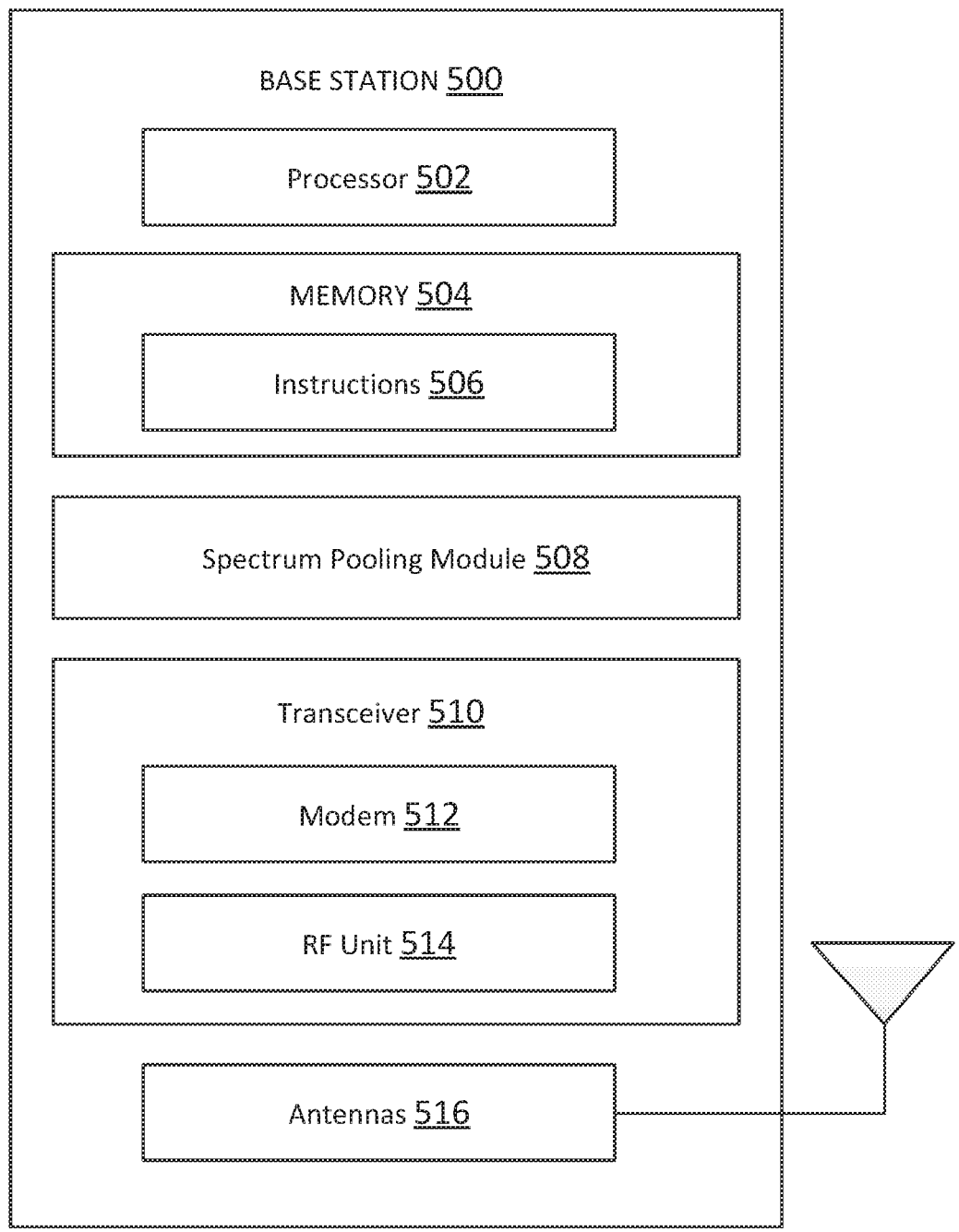
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 205 as discussed above. A shown, the BS 500 may include a processor 502, a memory 504, a spectrum pooling module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The spectrum pooling module 508 may be implemented via hardware, software, or combinations thereof. For example, the spectrum pooling module 508 may be implemented as a processor, circuit, and/or instructions 506 stored in the memory 504 and executed by the processor 502. The spectrum pooling module 508 may be used for various aspects of the present disclosure. For example, the spectrum pooling module 508 is configured to perform cell discovery, determine system timing and reservation signature sequences of neighboring cells operated by other operators, identify sharing frame structure, perform network listening, reserve time intervals in a shared spectrum, and/or determine reservation signature sequences for reservation signal transmissions in a cell (e.g., the cells 240) served by the BS 500, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 205 to enable the BS 205 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 215 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
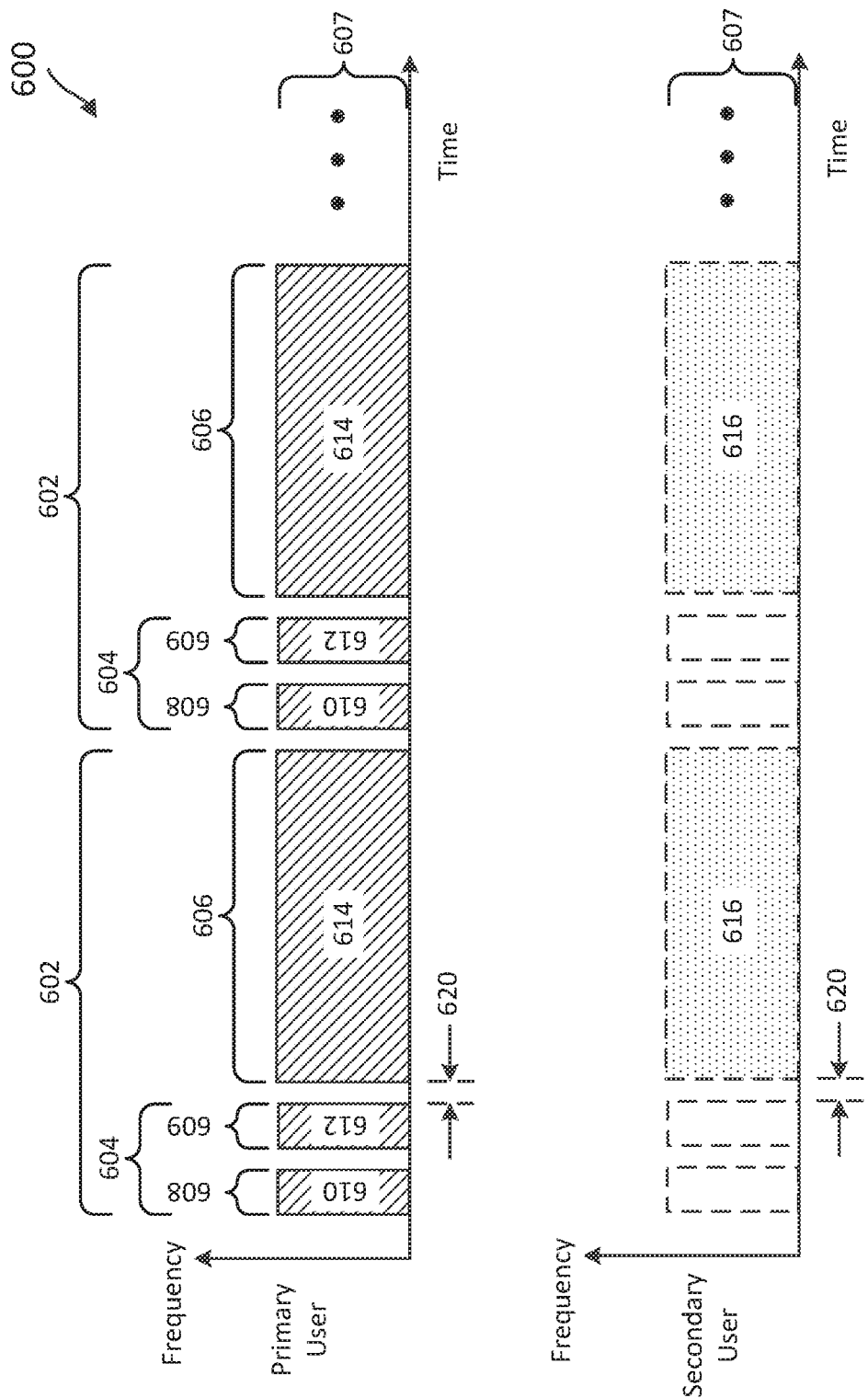
FIG. 6 illustrates a spectrum pooling scheme for downlink (DL) sharing according to embodiments of the present disclosure.

FIG. 6 illustrates a spectrum pooling scheme 600 for DL sharing according to embodiments of the present disclosure. The x-axis represents time in some constant units. The y-axis represents frequency in some constant units. The scheme 600 may be employed by the BSs 105, 205, and 500 and the UEs 115, 215, and 400. The scheme 600 is illustrated with a primary user (e.g., the spectrum owner) and a secondary user (e.g., another operator sharing the spectrum). A primary user may include primary BSs and primary UEs. Similarly, a secondary user may include secondary BSs and secondary UEs. In the scheme 600, a spectrum 607 is time-partitioned into a plurality of sharing frame periods 602. The spectrum 607 may correspond to the frequency band 310, 312, 314, or 316. Each sharing frame period 602 includes a reservation period 604 and a transmission period 606 separated by a gap period 620. The primary user can use the spectrum 607 for DL and/or UL communications 614 on a priority basis, while the secondary user can use the spectrum 607 for DL communication when the spectrum 607 is not occupied by the primary user.

The reservation period 604 is designated to the primary user for transmitting reservation signals to reserve the following transmission period 606. For example, a primary BS (e.g., the BS 205a) may transmit a reservation request signal 610 during a portion 608 of the reservation period 604. The reservation request signal 610 may include a pre-determined sequence, control, and/or data. The pre-determined sequence may be a CRS. The control may include one or more DL and/or UL triggers (e.g., schedules) for one or more primary UEs (e.g., the UE 215a). A scheduled or triggered UE may respond to the reservation request signal 610 by transmitting a reservation response signal 612 during a portion 609 of the reservation period. The reservation response signal 612 may include a pre-determined sequence (e.g., an SRS), control, and/or data. Subsequently, the primary BS may communicate UL and/or DL data 614 with the primary UE during the transmission period 606.

The reservation indicated by the reservation request signal 610 and the reservation response signal 612 can block or prevent secondary user nodes (e.g., potential interferers) from utilizing that the spectrum 607 during the transmission period 606. For example, a secondary BS (e.g., the BS 205b) may listen to the channel (e.g., the spectrum 607). Upon detection of the reservation request signal 610 and/or the reservation response signal 612, the secondary BS may refrain from accessing the spectrum 607 during the transmission period 606. Thus, the reservation request signal 610 can protect receptions of UL data and/or UL control at the BS, and the reservation response signal 612 can protect receptions of DL controls and/or DL data at the UE. However, when there is no reservation request signal 610 or the reservation response signal 612 detected, the secondary BS may communicate DL data 616 with one or more secondary UEs (e.g., the UE 215b) over the spectrum 607 during the transmission period as shown by the dashed patterned boxes. The gap period 620 allows secondary user nodes to process the reservation response signal 612.

The reservation request signal 610 and the reservation response signal 612 may include cell-specific signature sequences to facilitate reservation detection at the secondary user nodes. For example, the CRS in the reservation request signal 610 and the SRS in the reservation response signal 612 may be selected based on cell-specific identifier information, as described in greater detail herein. In addition, the UE may perform power control to increase the detectability of the reservation response signal 612 at the secondary user nodes, as described in greater detail herein.

Figure 7:
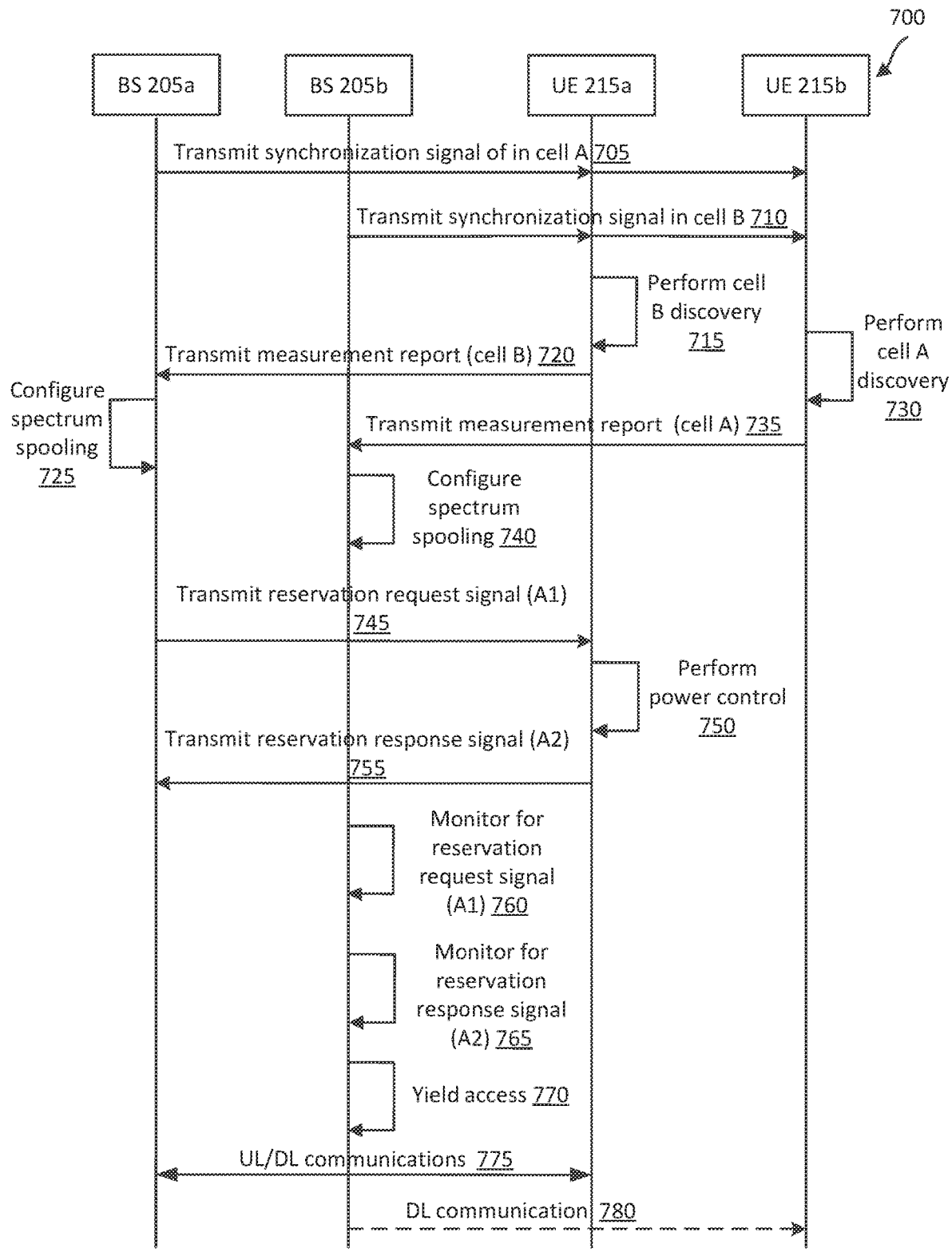
FIG. 7 illustrates a signaling diagram of a spectrum pooling method for DL sharing according to embodiments of the present disclosure.

FIG. 7 illustrates a signaling diagram of a spectrum pooling method 700 for DL sharing according to embodiments of the present disclosure. Steps of the method 700 can be executed by a computing device (e.g., a processor, processing circuit, and/or other suitable component) of wireless communication devices, such as the BSs 105, 205, and 500 and the UEs 115, 215, and 400. The method 700 may employ similar mechanisms as in the scheme 600 described with respect to FIG. 6. As illustrated, the method 700 includes a number of enumerated steps, but embodiments of the method 700 may include additional steps before, after, and in between the enumerated steps. In some embodiments, one or more of the enumerated steps may be omitted or performed in a different order.

The method 700 is described in the context of Operator A (e.g., the BS 205a and the UE 215a) and Operator B (e.g., the BS 205b and the UE 215b) sharing a licensed frequency band (e.g., the frequency band 312) of Operator A. However, the method 700 may be similarly applied to Operator A and Operator B sharing a licensed frequency band of Operator B (e.g., the frequency band 316). As shown above in FIG. 2, the BS 205a serves the UE 215a in the cell 240a, while the BS 205b serves the UE 215b in the cell 240b.

At step 705, the BS 205a transmits first synchronization signals in the cell 240a in a broadcast mode. For example, the first synchronization signals may include PSS, SSS, and PBCH signals. The first synchronization signals provide timing information and system information (SI) associated with the cell 240a. In some embodiments, the PSS and the SSS are physical signals carrying particular sequences. The PSS sequence may indicate a physical layer cell identity group number of the cell 240a and the SSS sequence may indicate a physical layer identity of the cell 240a. In such embodiments, a physical cell identifier (PCI) of the cell 240a is a function of the physical cell identify group and the physical layer identity. The PBCH signal can carry SI of the cell 240a. The transmissions of the first synchronization signals may be repeated based on some predetermined periodicities. The first synchronization signals can facilitate synchronization and cell access at UEs (e.g., the UE 215a) located within the cell 240a.

At step 710, the BS 205a transmits second synchronization signals in the cell 240b in a broadcast mode. The second synchronization signals may be similar to the first synchronization signals, but indicates SI and a PCI of the cell 240b. In an embodiment, the cell 240a's SI may include a public land mobile (PLMN) ID of the cell 240*a* and the cell 240*b*'s SI may indicate a PLMN ID of the cell 240*b*. A PLMN ID may identify a mobile network.

At step 715, the UE 215*a* may perform cell discovery for spectrum pooling by listening to the second synchronization signals of the cell 240*b*. For example, the UE 215*a* may obtain timing information and signal measurements of the cell 240*b* based on the second synchronization signals. At step 720, the UE 215*a* may transmit a measurement report to the BS 205*a*. The measurement report may include the timing information and signal measurements of the cell 240*b*. In some instances, the measurement report may additionally include the PLMN ID of the cell 240*b*.

At step 725, the BS 205*a* may determine system timing such as timing locations of synchronization channels and/or overhead channels of the cell 240*b* based on the report. The BS 205*a* may configure spectrum pooling with gaps to account for the synchronization channels and/or overhead channels of the cell 240*b*. For example, the BS 205*a* may avoid scheduling a transmission during the gaps when sharing operator B's spectrum.

Similarly, at step 730, the UE 215*b* may perform cell discovery for spectrum spooling by listening to the first synchronization signals of the cell 240*a*. At step 735, the UE 215*b* may transmit a measurement report to the BS 205*b*. The measurement report may indicate timing information and signal measurements of the cell 240*a*. In some instances, the measurement report may additionally include the PLMN ID of the cell 240*a*.

At step 740, the BS 205*b* may determine system timing such as timing locations of synchronization channels and/or overhead channels of the cell 240*a* based on the report for the cell 240*a*. The BS 205*a* may configure spectrum pooling with gaps to account for the synchronization channels and/or overhead channels of the cell 240*a*. For example, the BS 205*b* may avoid scheduling a transmission during the gaps when sharing Operator A's spectrum.

In an embodiment, the BS 205*a* may determine whether the cell 240*b* (e.g., a neighboring cell) belongs to the same mobile network as the cell 240*a* based on the PLMN IDs of the cells 240*a* and 240*b*. For example, when the cells 240*a* and 240*b* have the same PLMN ID, the cells 240*a* and 240*b* belong to the same mobile network. Similarly, the BS 205*b* may determine whether the cell 240*a* belongs to the same mobile network as the cell 240*b* based on the PLMN IDs of the cells 240*a* and 240*b*. In some embodiments, a primary user may request a secondary user to change the secondary user's cell identity to avoid confusion since cell identity information is used for reservations during spectrum pooling, as described in greater detail herein.

At step 745, the BS 205*a* may transmit a reservation request signal (e.g., the reservation request signal 610) during a reservation period (e.g., the reservation period 604) to reserve a spectrum (e.g., the spectrum 607) for following transmission period (e.g., the transmission period 606). The reservation request signal may include a UL or DL trigger to schedule one or more UEs (e.g., the UE 215*a*). The reservation request signal may carry a sequence (e.g., a CRS) of a signature, A1. The signature A1 sequence allows secondary user nodes to detect the reservation request signal. The signature A1 sequence may be dependent on the cell 240*a*'s PCI. In an embodiment, the reservation request signal may indicate an SRS trigger, SRS power control parameters, and/or a signature, denoted as A2, or a range of signatures for SRS transmissions. The signatures A1 and A2 or SRS signature sequence range are specific to the cell 240*a*. It should be noted that the BS 205*a* can schedule the UE 215*a* for a UE-specific SRS transmission for sounding during normal operation.

At step 750, the UE 215*a* may perform power control to determine a transmit power level for transmitting a reservation response signal (e.g., the reservation response signal 612). The reservation response signal may be transmitted at a power level based on the power control parameters received from the BS 205*a*. The power control may be an open loop control. Since the reservation response signal transmission is intended to be detected by secondary user nodes (e.g., potential interferers), the power control may be performed based on a path loss (PL) towards the cell 240*b* (e.g., a neighboring cell). In an embodiment, the power control may configure the transmit power level to be at a certain offset (e.g., about 5 decibels (dB) higher) from a nominal transmit power of the UE 215*a*. In an embodiment, the power control may configure the transmit power level to be at a maximum allowable transmit power level of the UE 215*a*.

At step 755, the UE 215*a* may transmit a reservation response signal based on the determined transmit power level. The reservation response signal may carry a sequence (e.g., an SRS) of the signature A2 indicated in the reservation request signal. The signature A2 sequence allows secondary user nodes to detect the reservation response signal.

At step 760, the BS 205*b* may monitor for a reservation request signal from Operator A (e.g., the BS 205*a*) during the reservation period. For example, the BS 205*b* may determine the signature A1 sequence based on the first synchronization signals received from the cell 240*a* during the cell discovery. The monitoring may include signal detection based on the determined signature A1 sequence. The BS 205*b* may obtain the signature A2 from the reservation request signal for subsequent reservation response signal monitoring. At step 765, the BS 205*b* may monitor for a reservation response signal from Operator A based on a signature A2 sequence during the reservation period.

At step 770, upon detection of the reservation request signal and/or the reservation response signal, the BS 205*b* may yield to Operator A, for example, by refraining from transmitting during the transmission period. At step 775, the BS 205*a* may communicate with the UE 215*a* in an UL direction and/or a DL direction (e.g., the UL/DL data 614) over the spectrum during the transmission period.

However, when there is no reservation request signal or reservation response signal 612 is detected, the BS 205*b* may proceed to access the spectrum during the transmission period. For example, at step 780, the BS 205*b* may communicate DL data (e.g., the DL data 616) with the UE 215*b* over the spectrum during the transmission period 606.

Figure 8:
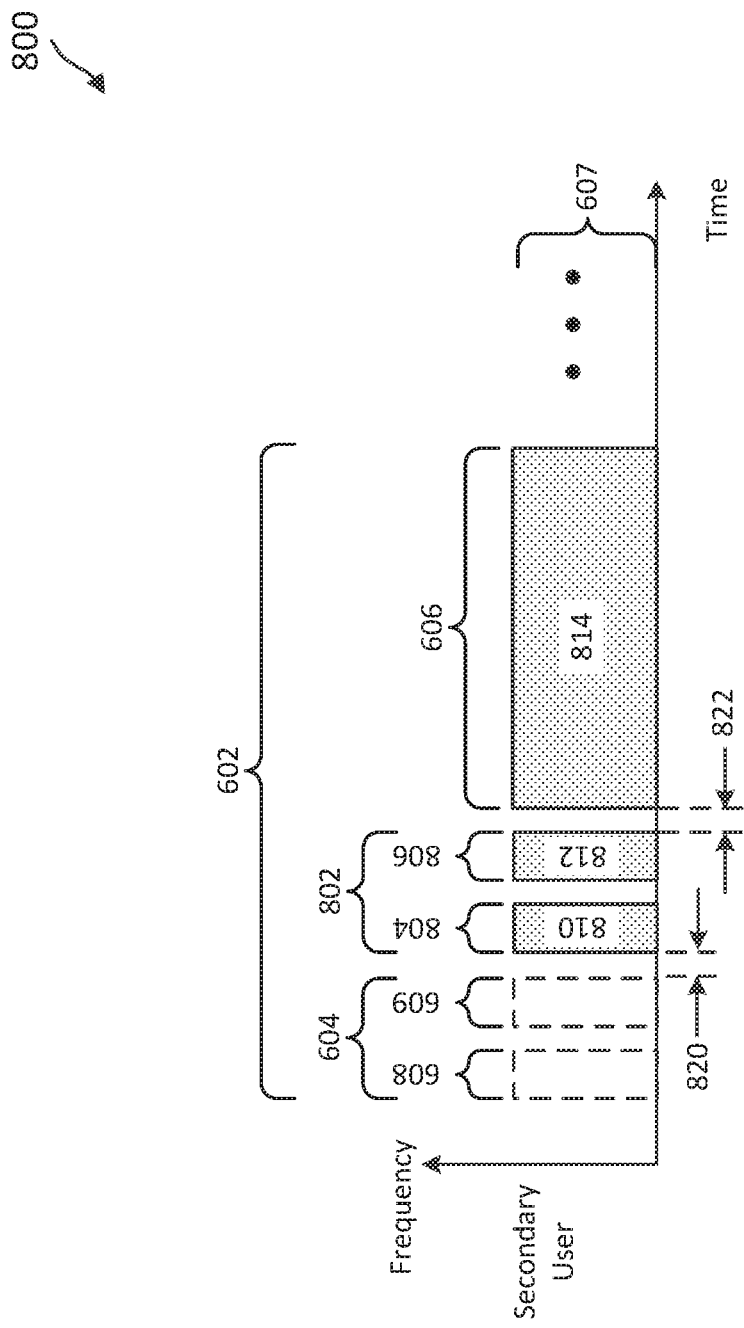
FIG. 8 illustrates a spectrum pooling scheme for uplink (UL) and DL sharing according to embodiments of the present disclosure.

FIG. 8 illustrates a spectrum pooling scheme 800 for UL and DL sharing according to embodiments of the present disclosure. The x-axis represents time in some constant units. The y-axis represents frequency in some constant units. The scheme 800 may be employed by the BSs 105, 205, and 500 and the UEs 115, 215, and 400. The scheme 800 is similar to the scheme 600, but additionally allows a secondary user to use a primary user's spectrum for UL and DL communications. In the scheme 800, the sharing frame period 602 includes an additional indication period 802 following the reservation period 604. The indication period 802 is separated from the reservation period 604 by a gap period 820 and separated from the transmission period 606 by a gap period 822. The indication period 802 is designated to a secondary user of the spectrum 607 for indicating a usage of the spectrum 607 during the transmission period 606. A primary user may utilize the spectrum 607 on a priority basis similar to the scheme 600. Secondary user nodes (e.g., the BSs 205 and the UEs 215) may monitor for a reservation request signal 610 and/or a reservation response signal 612 from primary user nodes during the reservation period 604. When there is no reservation request signal 610 and/or a reservation response signal 612 detected, the secondary user nodes may use the spectrum 607 for UL and/or DL data 814 communications during the transmission period 606. The gap periods 820 and 822 accommodate secondary user nodes' processing time.

The indication period 802 includes two portions 804 and 806. A secondary BS may transmit a reservation request signal 810 during the portion 804. The reservation request signal 810 may include DL and/or UL triggers. A scheduled or triggered secondary UE may respond by transmitting a reservation response signal 812 during the portion 806, as described in greater detail herein.

Figure 9:
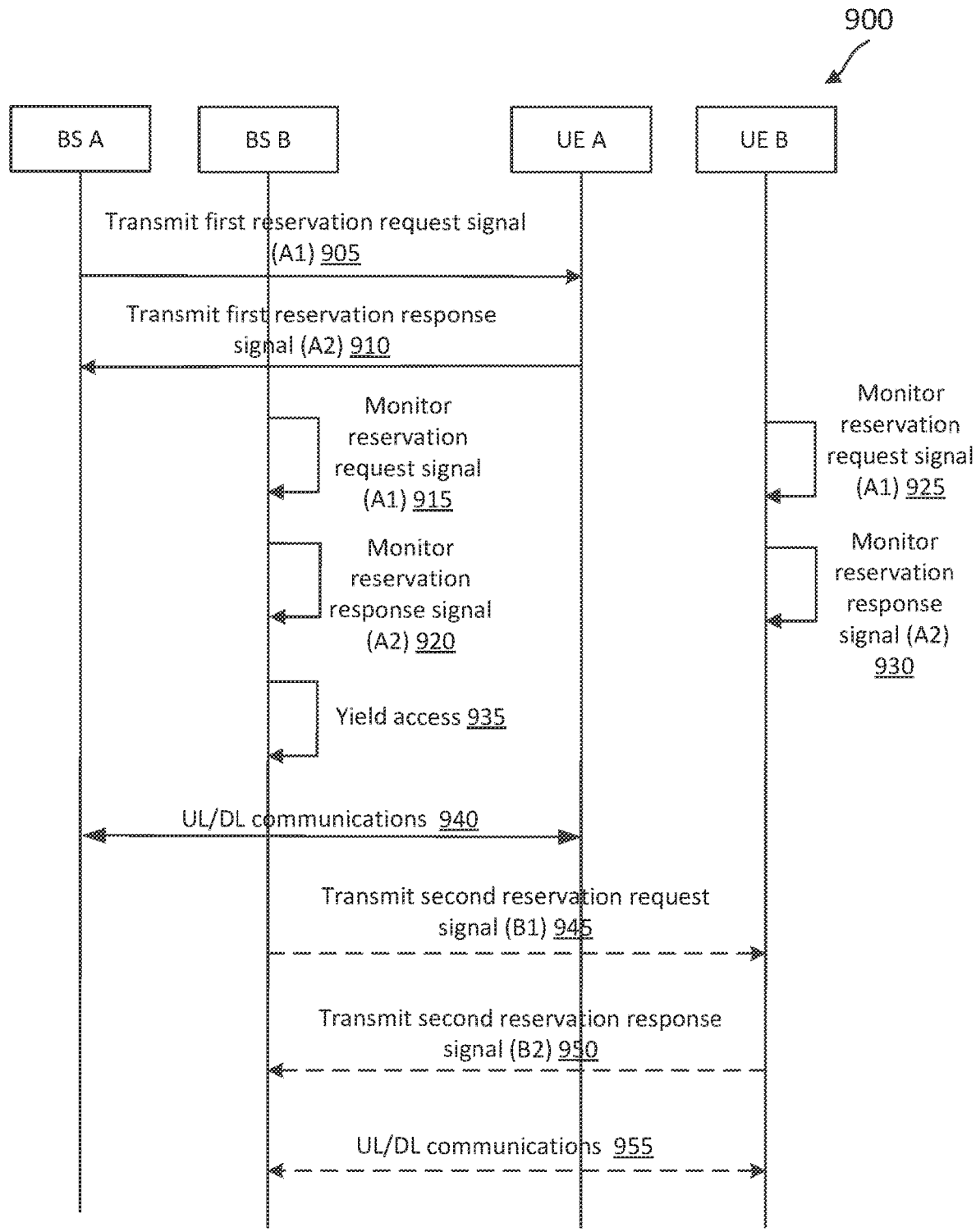
FIG. 9 illustrates a signaling diagram of a spectrum pooling method for UL and DL sharing according to embodiments of the present disclosure.

FIG. 9 illustrates a signaling diagram of a spectrum pooling method 900 for UL and DL sharing according to embodiments of the present disclosure. Steps of the method 900 can be executed by a computing device (e.g., a processor, processing circuit, and/or other suitable component) of wireless communication devices, such as the BSs 105, 205, and 500 and the UEs 115, 215, and 400. The method 900 may employ similar mechanisms as in the scheme 600 and 800 and the method 700 described with respect to FIGS. 6, 8, and 7, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

Similar to the method 700, the method 900 is described in the context of Operator A (e.g., the BS 205a and the UE 215a) and Operator B (e.g., the BS 205b and the UE 215b) sharing a licensed frequency spectrum band (e.g., the frequency band 312) of Operator A. The BS 205a and 205b and the UEs 215a and 215b may perform similar cell discovery, signal measurements, and reporting as described in the method 700. At step 905, the BS 205a (e.g., the primary BS) may transmit a first reservation request signal (e.g., the reservation request signal 610) during a reservation period (e.g., the reservation period 604) to reserve a spectrum (e.g., the spectrum 607) for a following transmission period (e.g., the transmission period 606). The first reservation request signal may include a signature A1 sequence (e.g., CRS) and/or a trigger for the UE 215a. The first reservation request signal may indicate a signature A2 for reservation response signals. At step 910, the UE 215a may respond by transmitting a first reservation response signal (e.g., the reservation response signal 612). The first reservation response signal may carry a signature A2 sequence (e.g., an SRS).

At step 915, the BS 205b (e.g., the secondary BS) may monitor for a reservation request signal from Operator A nodes during the reservation period based on the signature A1 sequence. At step 920, the BS 205b may monitor for a reservation response signal from Operator A nodes during the reservation period based on the signature A2 sequence.

At step 925, the UE 215b (e.g., the secondary UE) may monitor for a reservation request signal from Operator A nodes during the reservation period based on the signature A1 sequence. At step 930, the UE 215b may monitor for a reservation response signal from Operator A nodes (e.g., the primary UEs) during the reservation period based on the signature A2 sequence.

At step 935, upon detection of the first reservation request signal and/or the first reservation response signal, the BS 205b may yield to Operator A. At step 940, the BS 205a may communicate with the UE 215a in an UL direction and/or a DL direction (e.g., the UL/DL data 614) over the spectrum during the transmission period.

However, when there is no reservation request signal or reservation response signal detected from Operator A during the reservation period, the BS 205b may proceed to access the spectrum during the transmission period. For example, at step 945, the BS 205b may transmit a second reservation request signal (e.g., the reservation request signal 810) during an indication period (e.g., the indication period 802) after the reservation period. The second reservation request signal may include a signature B1 sequence (e.g., CRS) and/or a trigger for the UE 215b. The signature B1 may be based on the cell 240b's PCI. The second reservation request signal 810 may indicate a signature B2.

At step 950, the UE 215b may respond by transmitting a second reservation response signal (e.g., the reservation response signal 812). The second reservation response signal may carry a signature B2 sequence (e.g., an SRS). The UE 215b may transmit the second reservation response signal based on a normal power control since the second reservation response signal is intended for the serving cell 240b.

In an embodiment, the UE 215b may determine whether to respond to the second reservation request signal based on the monitoring of reservation response signals (e.g., SRSs) from Operator A's UEs. For example, the monitoring may be based on a threshold. The threshold may be relative to a reference signal receive signal power (RSRP) received from the serving BS 205b. When the receive signal power of a detected first reservation request signal is greater than a threshold compared to the RSRP, the UE 215b may not respond to the trigger. Otherwise, the UE 215b may respond to the trigger. In some embodiments, the UE 215b may monitor for a reservation response signal from the Operator A based on signature-dependent thresholds. For example, different signature ranges may correspond to different thresholds. When the receive signal power of the detected first reservation response signal is greater than a minimum detection threshold, the UE 215b may classify the detection based on the signature-dependent thresholds. For example, a first threshold may be used for a first signature range and a second threshold may be used for a second signature range for the classification. When the detected first reservation response signal includes a signature sequence within the first signature range, the UE 215b may include the detection information (e.g., the first threshold) in the reservation response signal 812. The detection information may allow the BS 205b to perform further interference assessment to determine whether to proceed with accessing the spectrum.

At step 955, the BS 205b may communicate DL and/or UL data (e.g., the UL/DL data 814) with the UE 215b over the spectrum during the transmission period.

Figure 10:
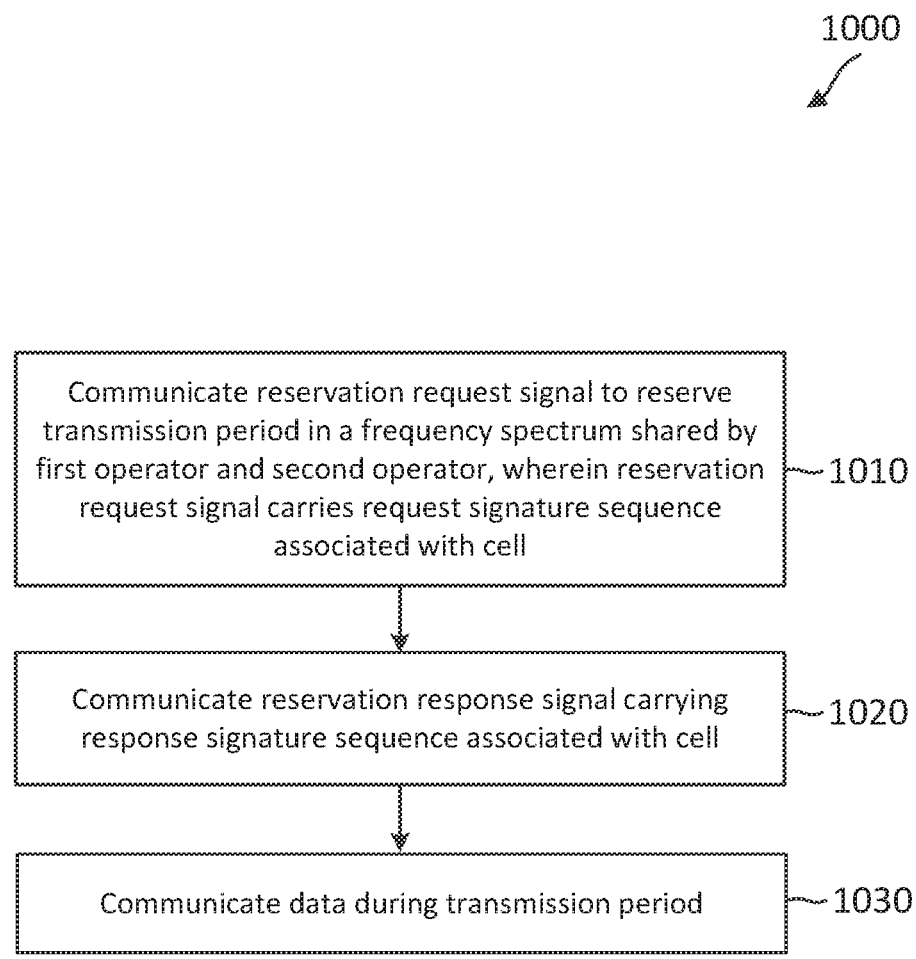
FIG. 10 is a flow diagram of a method of spectrum pooling according to embodiments of the present disclosure.

FIG. 10 is a flow diagram of a method 1000 of spectrum pooling according to embodiments of the present disclosure. Steps of the method 1000 can be executed by a computing device (e.g., a processor, processing circuit, and/or other suitable component) of a wireless communication device, such as the BSs 105, 205, and 500 and the UEs 115, 215, and 400. The method 1000 may employ similar mechanisms as in the schemes 600 and 800 and the methods 700 and 900 described with respect to FIGS. 6, 8, 7, and 9, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes communicating a reservation request signal (e.g., the reservation request signals 610 or 810) to reserve a transmission period (e.g., the transmission period 606) in a frequency spectrum (e.g., the spectrum 607 and the frequency bands 310, 312, 314, and 316) shared by a first operator (e.g., Operator A) and a second operator (e.g., Operator B). For example, reservation request signal is communicated between a first wireless communication device (e.g., the BS 205a) and a second wireless communication device (e.g., the UE 215a) associated with the first operator and a cell (e.g., the cell 240a). The reservation request signal carries a request signature sequence (e.g., the signature A1 sequence) associated with the cell. The signature sequence may correspond to a CRS generated based on a PCI of cell.

At step 1020, the method 1000 includes communicating a reservation response signal (e.g., the reservation response signal 612 or 812) with the second wireless communication device. The reservation response signal carries a response signature sequence (e.g., the signature A2 sequence) associated with the cell. The signature sequence may correspond to a common SRS or within of a subset of SRSs used for reservation response signals in the cell.

At step 1030, the method 1000 includes communicating data with the second wireless communication device over the spectrum during the transmission period.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure further include a method of wireless communication, comprising communicating, by a first wireless communication device with a second wireless communication device, a first reservation request signal to reserve a transmission period in a frequency spectrum shared by a first operator and a second operator, wherein the first wireless communication device and the second wireless communication device are associated with the first operator and a first cell, and wherein the first reservation request signal carries a request signature sequence associated with the first cell; and communicating, by the first wireless communication device with the second wireless communication device, data during the transmission period in the frequency spectrum shared by the first and second operators.

The method further includes wherein the frequency spectrum is a licensed spectrum of the first operator. The method further includes wherein the frequency spectrum is for secondary cell (Scell) communication by the first operator, and wherein the frequency spectrum is shared by the second operator for Scell communication. The method further includes wherein the request signature sequence is associated with a cell identifier of the first cell. The method further includes wherein the communicating the first reservation request signal includes receiving, by the first wireless communication device from the second wireless communication device, the first reservation request signal carrying the request signature sequence. The method further includes wherein the communicating the first reservation request signal includes transmitting, by the first wireless communication device to the second wireless communication device, the first reservation request signal carrying the request signature sequence. The method further includes communicating, by the first wireless communication device with the second wireless communication device in response to the first reservation request signal, a reservation response signal carrying a first response signature sequence associated with the first cell. The method further includes wherein the first reservation request signal indicates one or more response signature sequences including the first response signature sequence. The method further includes wherein the communicating the reservation response signal includes receiving, by the first wireless communication device from the second wireless communication device, the reservation response signal. The method further includes wherein the communicating the reservation response signal includes transmitting, by the first wireless communication device to the second wireless communication device, the reservation response signal. The method further includes determining, by the first wireless communication device, a transmit power level for the reservation response signal based on a second cell served by the second operator, and wherein the transmitting is based on the transmit power level. The method further includes receiving, by the first wireless communication device, a synchronization signal of a second cell of the first wireless communication device, wherein the second cell is served by the second operator; and determining, by the first wireless communication device, the request signature sequence associated with the second cell based on at least the synchronization signal. The method further includes wherein the frequency spectrum is a licensed spectrum of the second operator. The method further includes monitoring, by the first wireless communication device, for a second reservation request signal reserving the transmission period from a second cell based on at least a request signature sequence associated with the second cell, wherein the second cell is served by the second operator. The method further includes monitoring, by the first wireless communication device, for a reservation response signal from the second cell based on at least a response signature sequence associated with the second cell. The method further includes wherein the second reservation request signal indicates the response signature sequence associated with the second cell. The method further includes wherein the communicating the first reservation request signal is based on at least one of the monitoring for the second reservation request signal or the monitoring of the reservation response signal. The method further includes wherein the monitoring for the reservation response signal is based on a threshold associated with at least a receive signal power of the first reservation request signal. The method further includes wherein the monitoring for the reservation response signal is based on a threshold associated with at least the response signature sequence associated with the second cell.

Embodiments of the present disclosure further include an apparatus comprising a transceiver configured to communicate, with a second wireless communication device, a first reservation request signal to reserve a transmission period in a frequency spectrum shared by a first operator and a second operator, wherein the apparatus and the second wireless communication device are associated with the first operator and a first cell, and wherein the first reservation request signal carries a request signature sequence associated with the first cell; and communicate, with the second wireless communication device, data during the transmission period in the frequency spectrum shared by the first and second operators.

The apparatus further includes wherein the frequency spectrum is a licensed spectrum of the first operator. The apparatus further includes wherein the frequency spectrum is for secondary cell (Scell) communication by the first operator, and wherein the frequency spectrum is shared by the second operator for Scell communication. The apparatus further includes wherein the request signature sequence is associated with a cell identifier of the first cell. The apparatus further includes wherein the transceiver is further configured to communicate the first reservation request signal by receiving, from the second wireless communication device, the first reservation request signal carrying the request signature sequence. The apparatus further includes wherein the transceiver is further configured to communicate the first reservation request signal by transmitting, to the second wireless communication device, the first reservation request signal carrying the request signature sequence. The apparatus further includes wherein transceiver is further configured to communicate, with the second wireless communication device in response to the first reservation request signal, a reservation response signal carrying a first response signature sequence associated with the first cell. The apparatus further includes wherein the first reservation request signal indicates one or more response signature sequences including the first response signature sequence. The apparatus further includes wherein the transceiver is further configured to communicate the reservation response signal by receiving, from the second wireless communication device, the reservation response signal. The apparatus further includes wherein the transceiver is further configured to communicate the reservation response signal by transmitting, to the second wireless communication device, the reservation response signal. The apparatus further includes a processor configured to determine a transmit power level for the reservation response signal based on a second cell served by the second operator, wherein the transceiver is further configured to transmit the reservation response signal based on the transmit power level. The apparatus further includes wherein the transceiver is further configured to receive a synchronization signal of a second cell of the apparatus, wherein the second cell is served by the second operator, and wherein the apparatus is further configured to determine the request signature sequence associated with the second cell based on at least the synchronization signal. The apparatus further includes wherein the frequency spectrum is a licensed spectrum of the second operator. The apparatus further includes a processor configured to monitor for a second reservation request signal reserving the transmission period from a second cell based on at least a request signature sequence associated with the second cell, wherein the second cell is served by the second operator. The apparatus further includes wherein the processor is further configured to monitor for a reservation response signal from the second cell based on at least a response signature sequence associated with the second cell. The apparatus further includes wherein the second reservation request signal indicates the response signature sequence associated with the second cell. The apparatus further includes wherein the transceiver is further configured to communicate the first reservation request signal based on at least one of the monitoring for the second reservation request signal or the monitoring of the reservation response signal. The apparatus further includes wherein the processor is further configured to monitor for the reservation response signal based on a threshold associated with at least a receive signal power of the first reservation request signal. The apparatus further includes wherein the processor is further configured to monitor for the reservation response signal based on a threshold associated with at least the response signature sequence associated with the second cell.

Embodiments of the present disclosure further include a computer-readable medium having program code recorded thereon, the program code comprising code for causing a first wireless communication device to communicate, with a second wireless communication device, a first reservation request signal to reserve a transmission period in a frequency spectrum shared by a first operator and a second operator, wherein the first wireless communication device and the second wireless communication device are associated with the first operator and a first cell, and wherein the first reservation request signal carries a request signature sequence associated with the first cell; and code for causing the first wireless communication device to communicate, with the second wireless communication device, data during the transmission period in the frequency spectrum shared by the first and second operators.

The computer-readable medium further includes wherein the frequency spectrum is a licensed spectrum of the first operator. The computer-readable medium further includes wherein the frequency spectrum is for secondary cell (Scell) communication by the first operator, and wherein the frequency spectrum is shared by the second operator for Scell communication. The computer-readable medium further includes wherein the request signature sequence is associated with a cell identifier of the first cell. The computer-readable medium further includes wherein the code for causing the first wireless communication device to communicate the first reservation request signal includes code for causing the first wireless communication device to receive, from the second wireless communication device, the first reservation request signal carrying the request signature sequence. The computer-readable medium further includes wherein the code for causing the first wireless communication device to communicate the first reservation request signal includes code for causing the first wireless communication device to transmit, to the second wireless communication device, the first reservation request signal carrying the request signature sequence. The computer-readable medium further includes code for causing the first wireless communication device to communicate, with the second wireless communication device in response to the first reservation request signal, a reservation response signal carrying a first response signature sequence associated with the first cell. The computer-readable medium further includes wherein the first reservation request signal indicates one or more response signature sequences including the first response signature sequence. The computer-readable medium further includes wherein the code for causing the first wireless communication device to communicate the reservation response signal includes code for causing the first wireless communication device to receive, from the second wireless communication device, the reservation response signal. The computer-readable medium further includes wherein the code for causing the first wireless communication device to communicate the reservation response signal includes code for causing the first wireless communication device to transmit, to the second wireless communication device, the reservation response signal. The computer-readable medium further includes code for causing the first wireless communication device to determine a transmit power level for the reservation response signal based on a second cell served by the second operator, and wherein the transmitting is based on the transmit power level. The computer-readable medium further includes code for causing the first wireless communication device to receive a synchronization signal of a second cell of the first wireless communication device, wherein the second cell is served by the second operator; and code for causing the first wireless communication device to determine the request signature sequence associated with the second cell based on at least the synchronization signal. The computer-readable medium further includes wherein the frequency spectrum is a licensed spectrum of the second operator. The computer-readable medium further includes code for causing the first wireless communication device to monitor for a second reservation request signal reserving the transmission period from a second cell based on at least a request signature sequence associated with the second cell, wherein the second cell is served by the second operator. The computer-readable medium further includes code for causing the first wireless communication device to monitor for a reservation response signal from the second cell based on at least a response signature sequence associated with the second cell. The computer-readable medium further includes wherein the second reservation request signal indicates the response signature sequence associated with the second cell. The computer-readable medium further includes wherein the code for causing the first wireless communication device to communicate the first reservation request signal includes code for causing the first wireless communication device to communicate the first reservation request signal based on at least one of the monitoring for the second reservation request signal or the monitoring of the reservation response signal. The computer-readable medium further includes wherein the code for causing the first wireless communication device to monitor for the reservation response signal includes code for causing the first wireless communication device to monitor for the reservation response signal based on a threshold associated with at least a receive signal power of the first reservation request signal. The computer-readable medium further includes wherein the code for causing the first wireless communication device to monitor for the reservation response signal includes the code for causing the first wireless communication device to monitor for the reservation response signal based on a threshold associated with at least the response signature sequence associated with the second cell.

Embodiments of the present disclosure further include an apparatus comprising means for communicating, with a second wireless communication device, a first reservation request signal to reserve a transmission period in a frequency spectrum shared by a first operator and a second operator, wherein the apparatus and the second wireless communication device are associated with the first operator and a first cell, and wherein the first reservation request signal carries a request signature sequence associated with the first cell; and means for communicating, with the second wireless communication device, data during the transmission period in the frequency spectrum shared by the first and second operators.

The apparatus further includes wherein the frequency spectrum is a licensed spectrum of the first operator. The apparatus further includes wherein the frequency spectrum is for secondary cell (Scell) communication by the first operator, and wherein the frequency spectrum is shared by the second operator for Scell communication. The apparatus further includes wherein the request signature sequence is associated with a cell identifier of the first cell. The apparatus further includes wherein the means for communicating the first reservation request signal is further configured to receive, from the second wireless communication device, the first reservation request signal carrying the request signature sequence. The apparatus further includes wherein the means for communicating the first reservation request signal is further configured to transmit, to the second wireless communication device, the first reservation request signal carrying the request signature sequence. The apparatus further includes means for communicating, with the second wireless communication device in response to the first reservation request signal, a reservation response signal carrying a first response signature sequence associated with the first cell. The apparatus further includes wherein the first reservation request signal indicates one or more response signature sequences including the first response signature sequence. The apparatus further includes wherein the means for communicating the reservation response signal is further configured to receive, from the second wireless communication device, the reservation response signal. The apparatus further includes wherein the means for communicating the reservation response signal is further configured to transmit, to the second wireless communication device, the reservation response signal. The apparatus further includes means for determining a transmit power level for the reservation response signal based on a second cell served by the second operator, wherein the means for communicating the reservation response signal is further configured to transmit the reservation response signal based on the transmit power level. The apparatus further includes means for receiving a synchronization signal of a second cell of the apparatus, wherein the second cell is served by the second operator; and means for determining the request signature sequence associated with the second cell based on at least the synchronization signal. The apparatus further includes wherein the frequency spectrum is a licensed spectrum of the second operator. The apparatus further includes means for monitoring for a second reservation request signal reserving the transmission period from a second cell based on at least a request signature sequence associated with the second cell, wherein the second cell is served by the second operator. The apparatus further includes means for monitoring for a reservation response signal from the second cell based on at least a response signature sequence associated with the second cell. The apparatus further includes wherein the second reservation request signal indicates the response signature sequence associated with the second cell. The apparatus further includes wherein the means for communicating the first reservation request signal is further configured to communicate the first reservation request signal based on at least one of the monitoring for the second reservation request signal or the monitoring of the reservation response signal. The apparatus further includes wherein the means for monitoring for the reservation response signal is further configured to monitor for the reservation response signal based on a threshold associated with at least a receive signal power of the first reservation request signal. The apparatus further includes wherein the means for monitoring for the reservation response signal is further configured to monitor for the reservation response signal based on a threshold associated with at least the response signature sequence associated with the second cell.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   identifying, by a first wireless communication device, a frame period in a frequency spectrum shared by a first operator and a second operator, wherein the frequency spectrum is a licensed spectrum of the second operator, wherein the first operator has a first priority and the second operator has a second priority during the frame period, and wherein the first priority is different than the second priority;
   identifying, by the first wireless communication device, a first reservation period associated with the first operator in the frame period based on the first priority of the first operator;
   identifying, by the first wireless communication device, a second reservation period associated with the second operator in the frame period based on the second priority of the second operator;
   identifying, by the first wireless communication device, a transmission period in the frame period;
   communicating, by the first wireless communication device with a second wireless communication device during the first reservation period, a first reservation request signal indicating a reservation for the transmission period in the frequency spectrum, wherein the first wireless communication device and the second wireless communication device are associated with the first operator and a first cell, and wherein the first reservation request signal carries a request signature sequence associated with the first cell indicating the reservation for the transmission period; and
   communicating, by the first wireless communication device with the second wireless communication device, data during the reserved transmission period in the frequency spectrum shared by the first and second operators.

2. The method of claim 1, wherein the frequency spectrum is for secondary cell (Scell) communication by the second operator, and wherein the frequency spectrum is shared by the first operator for Scell communication.

3. The method of claim 1, wherein the request signature sequence is associated with a cell identifier of the first cell.

4. The method of claim 1, further comprising:
   communicating, by the first wireless communication device with the second wireless communication device in response to the first reservation request signal, a first reservation response signal carrying a first response signature sequence associated with the first cell.

5. The method of claim 4, wherein the first reservation request signal indicates one or more response signature sequences including the first response signature sequence.

6. The method of claim 4, further comprising:
   determining, by the first wireless communication device, a transmit power level for the first reservation response signal based on a measurement associated with a second cell served by the second operator,
   wherein the communicating the first reservation response signal includes transmitting, by the first wireless communication device to the second wireless communication device, the first reservation response signal based on the determined transmit power level.

7. The method of claim 1, further comprising:
   receiving, by the first wireless communication device, a synchronization signal of a second cell served by the second operator; and
   transmitting, by the first wireless communication device, a measurement report based on the received synchronization signal.

8. The method of claim 7, wherein the synchronization signal includes a public land mobile (PLMN) identifier (ID) of the second cell.

9. The method of claim 1, further comprising:
   monitoring, by the first wireless communication device during the second reservation period, at least one of:
   a second reservation request signal from a second cell reserving the transmission period based on a request signature sequence associated with the second cell, the second cell served by the second operator; or
   a reservation response signal from the second cell reserving the transmission period based on a response signature sequence associated with the second cell.

10. The method of claim 9, wherein the monitoring includes monitoring for the reservation response signal from the second cell based on a threshold associated with at least one of:
   a receive signal power of the first reservation request signal or the response signature sequence associated with the second cell; or
   the response signature sequence associated with the second cell.

11. An apparatus comprising:
   a processor configured to:
   identify a frame period in a frequency spectrum shared by a first operator and a second operator, wherein the frequency spectrum is a licensed spectrum of the second operator, wherein the first operator has a first priority and the second operator has a second priority during the frame period, and wherein the first priority is different than the second priority;

identify a first reservation period associated with the first operator in the frame period based on the first priority of the first operator;

identify a second reservation period associated with the second operator in the frame period based on the second priority of the second operator;

identify a transmission period in the frame period; and a transceiver configured to:

communicate, with a second wireless communication device during the first reservation period, a first reservation request signal indicating a reservation for the transmission period in the frequency spectrum, wherein the apparatus and the second wireless communication device are associated with the first operator and a first cell, and wherein the first reservation request signal carries a request signature sequence associated with the first cell indicating the reservation for the transmission period; and communicate, with the second wireless communication device, data during the reserved transmission period in the frequency spectrum shared by the first and second operators.

12. The apparatus of claim 11, wherein the frequency spectrum is for secondary cell (Scell) communication by the second operator, and wherein the frequency spectrum is shared by the first operator for Scell communication.

13. The apparatus of claim 11, wherein the request signature sequence is associated with a cell identifier of the first cell.

14. The apparatus of claim 11, wherein the transceiver is further configured to communicate, with the second wireless communication device in response to the first reservation request signal, a first reservation response signal carrying a first response signature sequence associated with the first cell.

15. The apparatus of claim 14, wherein the first reservation request signal indicates one or more response signature sequences including the first response signature sequence.

16. The apparatus of claim 14, wherein the processor is further configured to determine a transmit power level for the first reservation response signal based on measurement associated with a second cell served by the second operator, wherein the transceiver is further configured to communicate the first reservation response signal by transmitting, to the second wireless communication device, the first reservation response signal based on the determined transmit power level.

17. The apparatus of claim 11, wherein the transceiver is further configured to:

receive a synchronization signal of a second cell served by the second operator; and transmit a measurement report based on the synchronization signal.

18. The apparatus of claim 17, wherein the synchronization signal includes a public land mobile (PLMN) identifier (ID) of the second cell.

19. The apparatus of claim 11, wherein the processor is further configured to monitor, during the second reservation period, at least one of:

a second reservation request signal from a second cell reserving the transmission period based on a request signature sequence associated with the second cell, the second cell served by the second operator; or a reservation response signal from the second cell reserving the transmission period based on a response signature sequence associated with the second cell.

20. The apparatus of claim 19, wherein the processor is further configured to monitor for the reservation response signal from the second cell based on a threshold associated with at least one of:

a receive signal power of the first reservation request signal; or the response signature sequence associated with the second cell.

21. A non-transitory computer-readable medium having program code recorded thereon, the program code comprising:

code for causing a first wireless communication device to identify a frame period in a frequency spectrum shared by a first operator and a second operator, wherein the frequency spectrum is a licensed spectrum of the second operator, wherein the first operator has a first priority and the second operator has a second priority during the frame period, and wherein the first priority is different than the second priority;

code for causing the first wireless communication device to identify a first reservation period associated with the first operator in the frame period based on the first priority of the first operator;

code for causing the first wireless communication device to identify a second reservation period associated with the second operator in the frame period based on the second priority of the second operator;

code for causing the first wireless communication device to identifying, by the first wireless communication device, a transmission period in the frame period;

code for causing the first wireless communication device to communicate, with a second wireless communication device during the first reservation period, a first reservation request signal indicating a reservation for the transmission period in the frequency spectrum, wherein the first wireless communication device and the second wireless communication device are associated with the first operator and a first cell, and wherein the first reservation request signal carries a request signature sequence associated with the first cell indicating the reservation for the transmission period; and code for causing the first wireless communication device to communicate, with the second wireless communication device, data during the transmission period in the frequency spectrum shared by the first and second operators.

22. The non-transitory computer-readable medium of claim 21, wherein the frequency spectrum is for secondary cell (Scell) communication by the second operator, and wherein the frequency spectrum is shared by the first operator for Scell communication.

23. The non-transitory computer-readable medium of claim 21, wherein the request signature sequence is associated with a cell identifier of the first cell.

24. The non-transitory computer-readable medium of claim 21, further comprising:

code for causing the first wireless communication device to communicate, with the second wireless communication device in response to the first reservation request signal, a first reservation response signal carrying a first response signature sequence associated with the first cell.

25. The non-transitory computer-readable medium of claim 24, wherein the first reservation request signal indicates one or more response signature sequences including the first response signature sequence.

26. The non-transitory computer-readable medium of claim 24, further comprising:
   code for causing the first wireless communication device to determine a transmit power level for the first reservation response signal based on a measurement associated with a second cell served by the second operator,
   wherein the code for causing the first wireless communication device to communicate the first reservation response signal includes code for causing the first wireless communication device to transmit, to the second wireless communication device, the first reservation response signal based on the determined transmit power level.

27. The non-transitory computer-readable medium of claim 21, further comprising:
   code for causing the first wireless communication device to receive a synchronization signal of a second cell served by the second operator; and
   code for causing the first wireless communication device to transmit a measurement report based on the received synchronization signal.

28. The non-transitory computer-readable medium of claim 21, further comprising code for causing the first wireless communication device to monitor, during the second reservation period, for at least one of:
   a second reservation request signal from a second cell reserving the transmission period based on a request signature sequence associated with the second cell, the second cell served by the second operator; or
   a reservation response signal from the second cell reserving the transmission period based on a response signature sequence associated with the second cell.

29. The non-transitory computer-readable medium of claim 28, wherein the code for causing the first wireless communication device to monitor for the at least one of the second reservation request signal or the reservation response signal from the second cell is further configured to monitor for the reservation response signal from the second cell based on a threshold associated with at least one of:
   a receive signal power of the first reservation request signal; or
   the response signature sequence associated with the second cell.

* * * * *